US012591902B2

(12) United States Patent
Kang

(10) Patent No.: US 12,591,902 B2
(45) Date of Patent: Mar. 31, 2026

(54) METHOD FOR PREDICTING BUSINESS PERFORMANCE USING MACHINE LEARNING AND APPARATUS USING THE SAME

(71) Applicant: NFN ltd., Seoul (KR)

(72) Inventor: Byung Jun Kang, Chungju-si (KR)

(73) Assignee: NFN ltd., Seoul (KR)

( * ) Notice: Subject to any disclaimer, the term of this patent is extended or adjusted under 35 U.S.C. 154(b) by 324 days.

(21) Appl. No.: 18/366,373

(22) Filed: Aug. 7, 2023

(65) Prior Publication Data

US 2024/0046288 A1 Feb. 8, 2024

(30) Foreign Application Priority Data

Aug. 8, 2022 (KR) ........................ 10-2022-0098623

(51) Int. Cl.
*G06Q 30/0202* (2023.01)
*G06N 20/20* (2019.01)
*G06Q 30/0204* (2023.01)

(52) U.S. Cl.
CPC ......... *G06Q 30/0202* (2013.01); *G06N 20/20* (2019.01); *G06Q 30/0204* (2013.01)

(58) Field of Classification Search
CPC . G06N 20/20; G06Q 30/0204; G06Q 30/0202
See application file for complete search history.

(56) References Cited

U.S. PATENT DOCUMENTS 11,017,321 B1 * 5/2021 Mishra ............... G05B 23/0283
2014/0129561 A1 * 5/2014 Kern .................... G06F 16/285
707/740

(Continued)

FOREIGN PATENT DOCUMENTS

KR 10-2008845 B1 10/2019
KR 10-2128852 B1 7/2020
(Continued)

OTHER PUBLICATIONS

A Notice of Office Action mailed by the Korean Intellectual Property Office on Apr. 21, 2023, which corresponds to Korean Patent Application No. 10-2022-0098623 with English language translation.

(Continued)

*Primary Examiner* — Deirdre D Hatcher
(74) *Attorney, Agent, or Firm* — Studebaker Brackett PLLC

(57) ABSTRACT

Disclosed is a business performance predicting method performed by a company business performance predicting apparatus including obtaining, by an information collection unit, a data set including internal data and external data of a specific company, classifying, by an information classification unit, the data set into first data including structured data and second data including unstructured data, processing, by an information processing unit, the second data into third data being structured data corresponding to the first data, extracting, by a feature extraction unit, a feature based on the first data and the third data, and providing business performance prediction data of the specific company and business indicator data of the specific company mapped to a predetermined statistical attribute field through a predetermined prediction model in response to an individual characteristic of the feature.

9 Claims, 9 Drawing Sheets

(56) References Cited

U.S. PATENT DOCUMENTS

| | | | | |
|---|---|---|---|---|
| 2015/0019513 | A1* | 1/2015 | Dey | G06F 16/1748 |
| | | | | 707/746 |
| 2015/0095303 | A1* | 4/2015 | Sonmez | G06N 5/01 |
| | | | | 707/707 |
| 2020/0293962 | A1* | 9/2020 | Herman | G06Q 10/0633 |
| 2022/0188698 | A1* | 6/2022 | Halecky | G06Q 30/0613 |
| 2023/0101817 | A1* | 3/2023 | Sinha | G06F 16/41 |
| | | | | 707/722 |
| 2023/0196235 | A1* | 6/2023 | Turan | G06Q 30/0202 |
| | | | | 705/7.25 |
| 2024/0029175 | A1* | 1/2024 | Subrahmaniam | G06Q 40/123 |

FOREIGN PATENT DOCUMENTS

| | | |
|---|---|---|
| KR | 10-2021-0099879 A | 8/2021 |
| KR | 10-2022-0097822 A | 7/2022 |

OTHER PUBLICATIONS

Noah; "[ML] Understanding the XGBoost concept"; Aug. 4, 2020; URL: https://wooono.tistory.com/97; total 13 pages.

* cited by examiner

210

220

230

500

Start

S610

Clean data set

S620

Tokenize data

S630

Extract word by parsing
characters

S640

Perform integer encoding

End

| Strategy area | Strategy target | Measurement index | Measurement result | Target level | Current level |
|---|---|---|---|---|---|
| Finance strategy (Finance Strategy) | F1. Sales growth strategy | F1.1. Achieving 120% of sales target compared to previous year (existing product/service strategy) | 100 billion won | 1.2 | 0.3 |
| | | F1.2. Achieving 30% of new product sales compared to total sales | 21% | 1.0 | 0.7 |
| | F2. productivity improvement | F2.1. Achieving 10% of cost reduction | 1% | 1.0 | 0.1 |
| | | F2.2. Achieving 50% of net margin rate | 15% | 1.0 | 0.3 |
| | | F2.3. Maintaining 30% of increase in cash flow compared to previous year | 20% | 1.0 | 0.2 |

METHOD FOR PREDICTING BUSINESS PERFORMANCE USING MACHINE LEARNING AND APPARATUS USING THE SAME

CROSS-REFERENCE TO RELATED APPLICATIONS

A claim for priority under 35 U.S.C. § 119 is made to Korean Patent Application No. 10-2022-0098623 filed on Aug. 8, 2022 in the Korean Intellectual Property Office, the entire contents of which are hereby incorporated by reference.

BACKGROUND

Embodiments of the inventive concept described herein relate to a method for predicting business performance and an apparatus using the same, and more particularly, relate to a method for predicting business performance of a company by training data related to a company through machine learning and an apparatus using the method.

The business performance of a specific company is very helpful in determining investment decisions for the corresponding company. Most of the prior arts related to this have taken a lot of time to derive results by analyzing management-related data for a specific company up to now.

Accordingly, to increase the required time and the accuracy of analysis, training methods are being attempted to analyze various pieces of data related to the business performance of the company through machine learning.

In this regard, there is a prior art disclosed as Korean Patent Registration No. 10-2008845.

(Patent Document 1) KR 10-2008845 B.

SUMMARY

Embodiments of the inventive concept provide an apparatus that extracts information, which is required by a user, from random data, processes the information appropriately, and provides the processed information.

Problems to be solved by the inventive concept are not limited to the problems mentioned above, and other problems not mentioned will be clearly understood by those skilled in the art from the following description.

According to an embodiment, a business performance predicting method performed by a company business performance predicting apparatus includes obtaining, by an information collection unit, a data set including internal data and external data of a specific company, classifying, by an information classification unit, the data set into first data including structured data and second data including unstructured data, processing, by an information processing unit, the second data into third data being structured data corresponding to the first data, extracting, by a feature extraction unit, a feature based on the first data and the third data, and providing business performance prediction data of the specific company and business indicator data of the specific company mapped to a predetermined statistical attribute field through a predetermined prediction model in response to an individual characteristic of the feature.

Besides, a computer program stored in a computer-readable recording medium for implementing a company business performance predicting method of the inventive concept may be further provided.

In addition, a computer-readable recording medium for recording a computer program for performing the method for implementing the inventive concept may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 8 is a diagram of a data set, according to various embodiments of the inventive concept.

DETAILED DESCRIPTION

Figure 1:
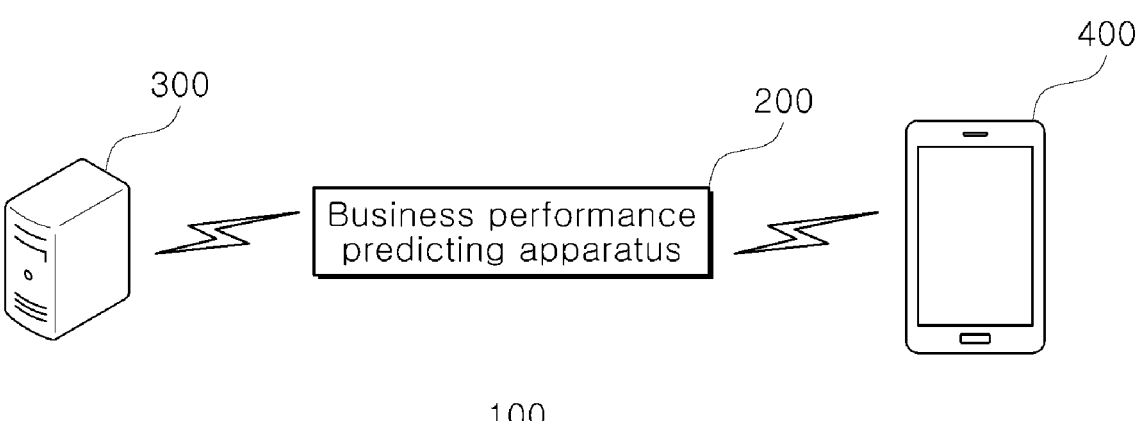
FIG. 1 is a block diagram of a system, in which devices for providing a method for predicting company business performance are connected through a network, according to various embodiments of the inventive concept.

The same reference numerals denote the same elements throughout the inventive concept. The inventive concept does not describe all elements of embodiments. Well-known content or redundant content in which embodiments are the same as one another will be omitted in a technical field to which the inventive concept belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the inventive concept will be described with reference to the accompanying drawings.

In this specification, a 'company business performance predicting apparatus' includes all various devices capable of providing results to a user by performing arithmetic processing. For example, a company business performance predicting apparatus according to an embodiment of the inventive concept may include a computer, a server device, and a portable terminal, or may be in any one form thereof.

Here, for example, the computer may include a notebook computer, a desktop, a laptop, a tablet PC, a slate PC, or the like, which is equipped with a web browser.

The server device may be a server that processes information by communicating with an external device, and may include an application server, a computing server, a database server, a file server, a game server, a mail server, a proxy server, and a web server.

The portable terminal may be, for example, a wireless communication device ensuring portability and mobility, and may include all types of handheld-based wireless communication devices such as a personal communication system (PCS), a global system for mobile communication (GSM), a personal digital cellular (PDC), a personal handy-phone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro) terminal, a smart phone, or the like, and wearable devices such as a timepiece, a ring, a bracelet, an anklet, a necklace, glasses, a contact lens, or a head-mounted-device (HMD).

A data set of the inventive concept consists of internal data and external data related to a company. The internal data is data related to a specific company capable of being obtained from an intranet of a specific company, an internal network of the specific company, or a database accessible through the intranet and internal network of the specific company. The external data includes data that is incapable of being managed by the specific company, and includes all pieces of external data that match meta data regarding the specific company.

Data pre-processing of the inventive concept includes a procedure of processing unstructured data into structured data. Feature engineering includes a series of processes for deriving an intended result value from the data set by extracting a feature from the processed data set.

An ensemble model of the inventive concept may refer to a model that produces superior performance compared to a single model by combining a plurality of shallow models. The ensemble model of the inventive concept may include a classification-and-regression-trees (CART) model in an extreme-gradient-boosting (XGB) method.

The result value of the inventive concept is a value derived based on the feature extracted from the data set. The result value of the inventive concept is company business performance prediction data and company business indicator data depending on the type of a feature set. The company business performance prediction data refers to data for predicting the business performance of a company. The company business indicator data corresponds to statistical data, and includes statistical data regarding indicators related to company management up to a present point in time when the result value is queried, or statistical data regarding updated data at the time of querying the result value.

FIG. 1 is a block diagram of a system 100, in which devices for providing a method for predicting company business performance are connected through a network, according to various embodiments of the inventive concept.

Referring to FIG. 1, a business performance predicting apparatus 200, an external device 300, and a user terminal 400 may exchange data with different nodes. As such, each node may be connected through a network.

The business performance predicting apparatus 200 may be a device that predicts the business performance of a specific company. The business performance predicting apparatus 200 may receive various pieces of data within the system 100 and may provide a result value in response to a request for the result value from the user terminal 400. The business performance predicting apparatus 200 may include a device that operates and manages software or a platform for predicting company business performance as a whole, and may be a server providing a company business performance prediction result.

The result value of the inventive concept may include company business performance prediction data and company business indicator data. For example, the company business performance prediction data includes data for predicting the overall business performance of a specific company through data collected up to now. For another example, the company business indicator data includes statistical data regarding the overall business performance of a specific company through data collected up to now. The company business indicator data may be implemented to correspond to a statistical attribute field set by a specific company.

According to an embodiment, data related to the business performance of a specific company may be provided in various forms. Nowadays, a technology is widely used to train and classify all pieces of data related to a specific company through machine learning in a necessary form. For example, the machine learning may be performed to extract overall data depending on characteristics of features based on the field of interest in a specific company. Such the machine learning method may be set through various models.

The company business performance prediction data according to an embodiment may be a result value according to a feature extracted from a data set through a predetermined prediction model (e.g., an ensemble model). For example, the feature may be a first feature set.

The company business indicator data according to an embodiment may be a result value mapped to a predetermined statistical attribute field depending on the feature extracted from the data set. For example, the feature may be a second feature set.

A data processing process according to an embodiment may be performed by an open machine learning process, and may provide a result value by setting a model depending on needs of a specific company. The needs of the specific company may be the needs for the result value to be provided, and, in detail, may be a form or type of the result value to be provided.

The company business performance prediction data and the company business indicator data according to an embodiment may correspond to result values through overall text data mining. The text data mining may be a process of converting unstructured data (e.g., unstructured data) into structured data (e.g., structured data) to identify meaningful patterns and new insights. The company business performance predicting method of the inventive concept may identify and provide hidden relationships in the unstructured data.

To perform text mining according to an embodiment, a model is required to structure the unstructured data and processes the result as structured data. A general text mining models include a bag-of-word (BOW) model and an N-gram model.

The BOW model may be a model used for natural language processing and information search, and may perform a function of simplifying expressions. In general, the BOW model is used for a data classification method that uses the frequency of occurrence of each word as a training feature. The N-gram model may perform a function of expressing a vector by grouping 'n' words, which frequently appear together in data, into a group. This is a model based on statistics and is a kind of a statistical language model (SLM).

Besides, there is a topic model, which is a statistical model for searching for representative topics in data. An ensemble model in the inventive concept may be a model that utilizes the BOW model and the N-gram model among the models individually or in combination. The statistical model in the inventive concept may be a model utilizing a topic model.

In particular, the company business performance prediction data of the inventive concept may be a result value obtained by training a data set through the ensemble model. Moreover, the company business indicator data of the inventive concept may be a result value obtained by training a data set through a topic model.

The external device 300 may include a device connected to the business performance predicting apparatus 200 over a network through an internal communication module or transceiver. For example, the external device 300 may be a device implemented as a database server and including a storage unit. In particular, the database server may be a server that collects external data, which is data constituting a data set.

For example, the external data may be data requested from the business performance predicting apparatus 200 to the external device 300. To generate the data set, the business performance predicting apparatus 200 may receive the external data from the external device 300 periodically or in real time. The external device 300 may be a device that collects pieces of data other than data managed by a specific company.

The user terminal 400 of the inventive concept may be a device that receives the company business performance prediction data and the company business indicator data from the business performance predicting apparatus 200. The user terminal 400 includes a computer or terminal controllable by the specific company.

Figure 2:
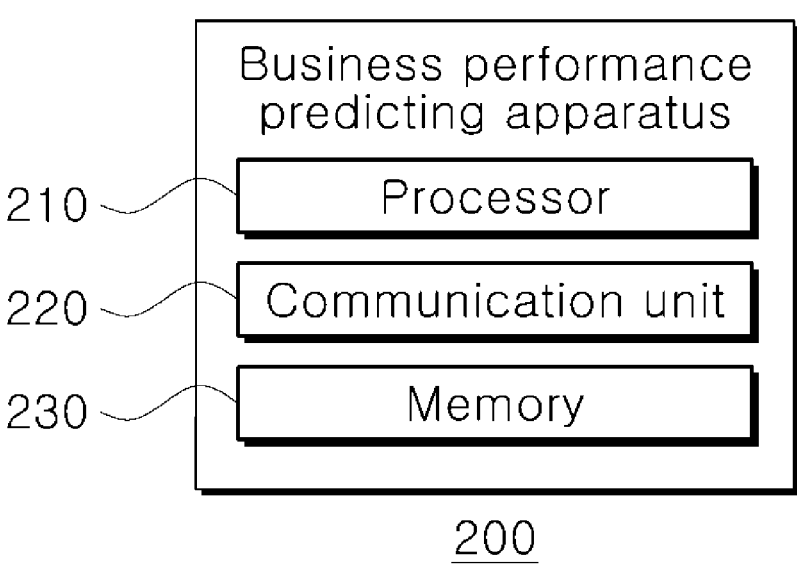
FIG. 2 is a schematic block diagram of components of a business performance predicting apparatus, according to various embodiments of the inventive concept.

FIG. 2 is a schematic block diagram of components of a business performance predicting apparatus, according to various embodiments of the inventive concept.

The business performance predicting apparatus 200 according to an embodiment of the inventive concept may include a processor 210, a communication unit 220, and a memory 230 as internal components, but is not limited thereto.

Referring to FIG. 2, the processor 210 may process a series of steps for performing a company business performance prediction data providing method according to various embodiments of the inventive concept. The processor 210 may control other components of the business performance predicting apparatus 200.

In a process of providing company business performance prediction data and company business indicator data of the inventive concept, the processor 210 according to an embodiment may control individual function blocks depending on functions of performing individual operations. For example, the processor 210 may control functional blocks such as an information collection unit, an information classification unit, an information processing unit, and a feature extraction unit.

The processor 210 according to an embodiment may be implemented as the memory 230, which stores data for an algorithm for controlling operations of components in the business performance predicting apparatus 200 or a program implementing the algorithm, and at least one functional block that performs the above-described operation by using the data stored in the memory 230. In this case, the memory 230 and the processor 210 may be implemented as separate chips. Alternatively, the memory 230 and the processor 210 may be implemented as a single chip.

Moreover, to implement various embodiments of the inventive concept described in FIGS. 3A, 3B, 4, 6, and 7 below on the business performance predicting apparatus 200, the processor 210 may control any one or a combination of a plurality of the components described above.

The communication unit 220 of the business performance predicting apparatus 200 may perform a function of transmitting information stored in the memory 230 of the business performance predicting apparatus 200 or information processed by the processor 210 to another device, or a function of receiving information from another device to the business performance predicting apparatus 200. For example, the business performance predicting apparatus 200 may exchange information with an external device (e.g., the external device 300 in FIG. 1) through the communication unit 220.

The communication unit 220 according to an embodiment may include one or more components capable of communicating with an external device, and may include at least one of, for example, a wired communication module, a wireless communication module, and a short-range communication module.

The wired communication modules include not only various wired communication modules such as a local area network (LAN) module, a wide area network (WAN) module, or a value added network (VAN) module, but also various cable communication modules such as universal serial bus (USB), high definition multimedia interface (HDMI), digital visual interface (DVI), recommended standard 232 (RS-232), power line communication, or plain old telephone service (POTS).

The wireless communication module may support various wireless communication methods such as Global System for Mobile (GSM) communication, Code Division Multiple Access (CDMA), Wideband Code Division Multiple Access (WCDMA), Universal Mobile Telecommunication System (UMTS), Time Division Multiple Access (TDMA), Long Term Evolution (LTE), 4G, 5G, and 6G in addition to a Wi-Fi module and Wireless broadband module.

The short-range communication may be used for short range communication, and may support short-range communication by using at least one of Bluetooth™, radio frequency identification (RFID), infrared data association (IrDA), ultra wideband (UWB), ZigBee, near field communication (NFC), Wireless-Fidelity (Wi-Fi), Wi-Fi Direct, and wireless universal serial bus (Wireless USB) technologies.

The memory 230 of the business performance predicting apparatus 200 may be a data structure implemented in a predetermined storage space of the business performance predicting apparatus 200, and functions such as saving, searching for, deleting, editing, or adding data may be arbitrarily performed. For example, the memory 230 may include fields or elements for processing functions of saving, searching for, deleting, editing, or adding data. For another example, the memory 230 may be provided on a separate cloud server or database server.

The memory 230 may store data for supporting various functions of the business performance predicting apparatus 200, and a program for an operation of the processor 210, may store pieces of input/output data (e.g., a document file, a music file, a still image, a video, and the like), and may store a plurality of application programs (or applications) driven by the business performance predicting apparatus 200, pieces of data for an operation of the present apparatus, and commands. At least part of the application programs may be downloaded from an external server through wireless communication.

The memory 230 may include the type of a storage medium of at least one of a flash memory type, hard disk type, a Solid State Disk (SSD) type, a Silicon Disk Drive (SDD) type, a multimedia card micro type, a memory of a card type (e.g., SD memory, XD memory, or the like), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disc. In addition, the memory 230 may be separated from the business performance predicting apparatus 200, but may be a database connected by wire or wirelessly.

An interface unit (not shown) according to an embodiment serves as a passage for various types of external devices connected to the present apparatus. The interface unit may include at least one of a wired/wireless headset port, an external charger port, a wired/wireless data port, a memory card port, a port for connecting a device equipped with a subscriber identity module (SIM), an audio input/output (I/O) port, a video I/O port, or an earphone port. In the present apparatus, appropriate control related to an external device connected to the interface unit may be performed.

At least one component may be added or deleted to correspond to the performance of internal components of the business performance predicting apparatus 200 shown in FIG. 2. Furthermore, it will be easily understood by those skilled in the art that mutual locations of components may be changed to correspond to the performance or structure of a system.

In the meantime, each component shown in FIG. 2 means software and/or hardware components such as field programmable gate array (FPGA) and application specific integrated circuit (ASIC).

Figure 3A:
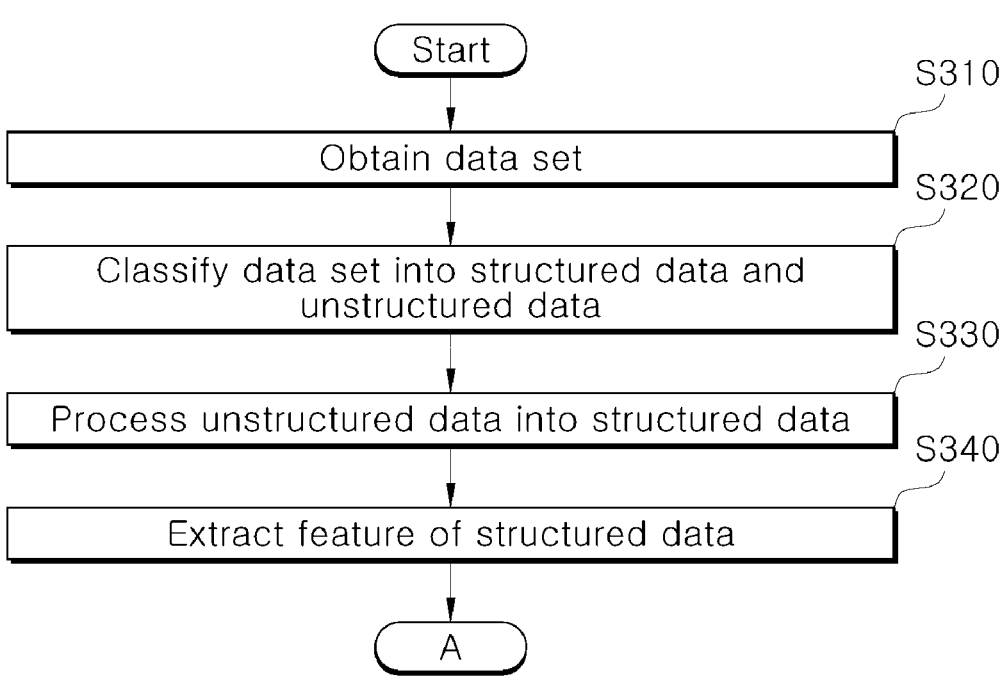
FIGS. 3A and 3B are schematic flowcharts of a company business performance predicting method, according to various embodiments of the inventive concept.
Figure 3B:
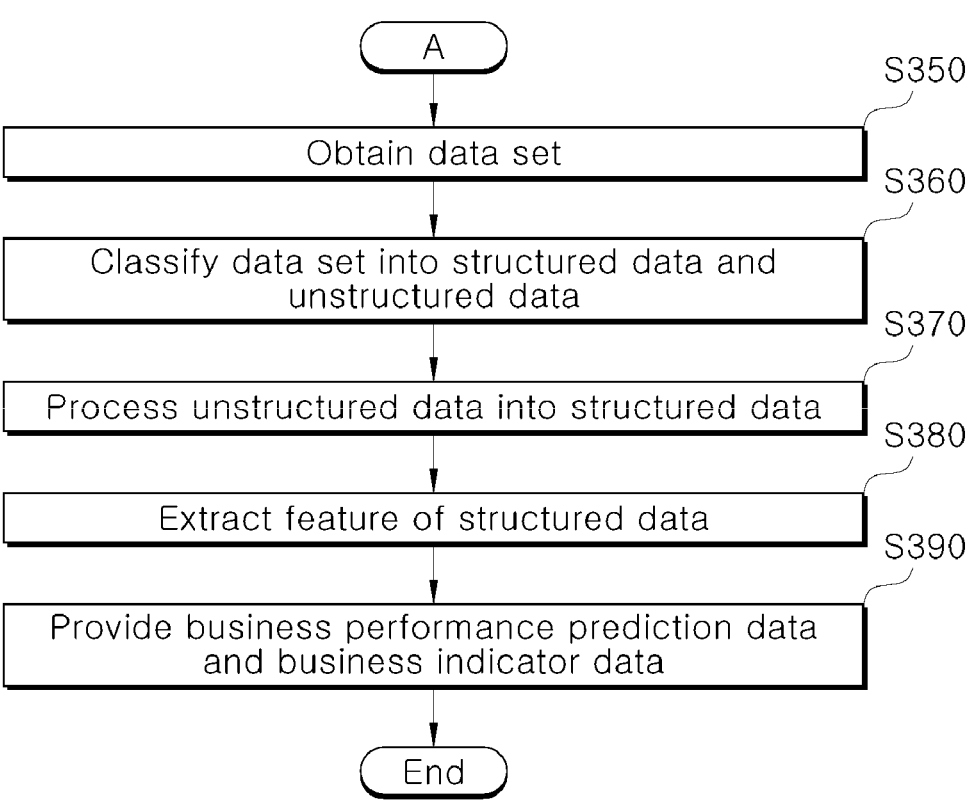

FIGS. 3A and 3B are schematic flowcharts of a company business performance predicting method, according to various embodiments of the inventive concept. For example, FIG. 3A may be a flow of training a prediction model through a data set related to a specific company for performing a company business performance predicting method. For example, FIG. 3B may be a flow of performing a business performance predicting method of a specific company through the trained prediction model of FIG. 3A.

Referring to FIG. 3A, a business performance predicting apparatus (e.g., the business performance predicting apparatus 200 in FIG. 1) may provide another device with company business performance prediction data and company business indicator data.

In S310, a processor (e.g., the processor 210 in FIG. 2) may obtain a data set from an information collection unit. The data set includes internal data and external data of a specific company.

The processor according to an embodiment may obtain the internal data from a memory (e.g., the memory 230 in FIG. 2) and may obtain the external data through an external device (e.g., the external device 300 in FIG. 1). In this case, the processor may obtain the data set in a format of original data before processing the data set in a data format to be provided to a user terminal (e.g., the user terminal 400 in FIG. 1).

In S320, the processor may classify the data set into first data and second data in an information classification unit. The first data includes structured data, and the second data includes unstructured data.

According to an embodiment, the internal data and the external data include the structured data and the unstructured data, respectively. This will be described with reference to FIG. 5.

In S330, the processor may process unstructured data into structured data in an information processing unit. The structured data may be structured data organized in an Excel table format. The unstructured data may be unstructured data such as documents or image files.

According to an embodiment, the processor may process a text of the unstructured data through a natural language processing process. Here, the processing of the text may include a pre-processing process of processing a string included in the unstructured data and extracting the processed string in units of stem or word. That is, the processor may control the pre-processing process of processing the unstructured data into the structured data in an information processing unit.

In detail, the processor may process the second data including the unstructured data among the data, which is classified in S320, into the structured data such that the second data corresponds to the format of the first data including the structured data. In this case, data obtained by processing the second data into the structured data may be referred to as "third data". The third data corresponds to the data structure and expression format of the first data, and is structured data.

According to an embodiment, the processing of the data includes identifying a string of the second data including the unstructured data, and extracting information based on the identified string and extracting a word by tokenizing characters. This will be described with reference to FIG. 6.

In S340, the processor may extract a feature of the data set in a feature extraction unit. The data set from which the feature is extracted includes the structured data processed in S330.

According to an embodiment, the extracting of the feature includes a feature scaling step of re-scaling and regulating the structured data after feature vectorization. This will be described with reference to FIG. 7.

According to an embodiment, the processor may train and distribute a model for outputting company business performance prediction data and business indicator data based on a data set related to a specific company through S310 to S340 of FIG. 3A. Here, the model may include a model for outputting the business performance prediction data and a model for outputting the business indicator data. In particular, the model may be related to a predetermined model and a predetermined statistical attribute field, and may be a specific model for outputting the company business performance prediction data and the business indicator data through the data set related to a specific company.

Through the flow of FIG. 3A, the processor according to an embodiment may train a model optimized to output the company business performance prediction data and the business indicator data with regard to a specific company. In detail, the processor may complete training while going through the processes of S310 to S340 of FIG. 3A. In more detail, the processor may complete training after the process of S340. In FIG. 3A, training and distribution of a model for a data set related to a specific company by a processor is represented as 'A'. That is, the processor may perform a predicting process of FIG. 3B through the model trained after 'A' of FIG. 3A.

According to an embodiment, the processor may perform the predicting process of FIG. 3B based on the model trained after the training process of FIG. 3A. Descriptions about the processor performing processes of S350 to S380 of FIG. 3B through the model trained after 'A' are replaced with the descriptions of S310 to 340.

In S390, the processor may provide the business performance prediction data and the business indicator data. The business performance prediction data and the business indicator data may relate to a specific company and may be a result value provided based on the data set obtained in S350.

According to an embodiment, the specific company may receive business performance data through business management-related data obtained within the corresponding company and data issued outside the corresponding company with regard to business management of the corresponding company. For example, the business performance prediction data refers to data for predicting the business performance of a specific company. For example, the business performance indicator data refers to business performance statistical data of a specific company.

According to an embodiment, the company business performance prediction data refers to data for predicting future performance data of a specific company by applying current data of the specific company. For example, the company business performance prediction data refers to data of a result value for a feature set (e.g., a first feature set) extracted through the predetermined model composed of CART model in an XGB method. The company business performance prediction data finally provided includes stock index prediction data of a specific company and business indicator prediction data for its own business indicator index.

According to an embodiment, the company business indicator data refers to data indicating performance statistics of a specific company up to now by applying current data of the specific company. For example, the company business indicator data refers to data obtained by mapping a result value for a feature set (e.g., a second feature set) extracted based on predetermined statistical attribute fields including a finance field, a customer field, a process field, and a sustainability field. The company business indicator data finally provided includes graph data corresponding to a predetermined statistical attribute field, correlation data, and comparison data (e.g., comparison data with the target value) between a target value and a currently achieved value.

The processor according to an embodiment may train a model for providing the business performance prediction data and the business indicator data through a data set related to a specific company. In detail, the processor may provide the business performance prediction data and the business indicator data through the trained model by using a data set related to a specific company as an input value based on the trained model.

Figure 4:
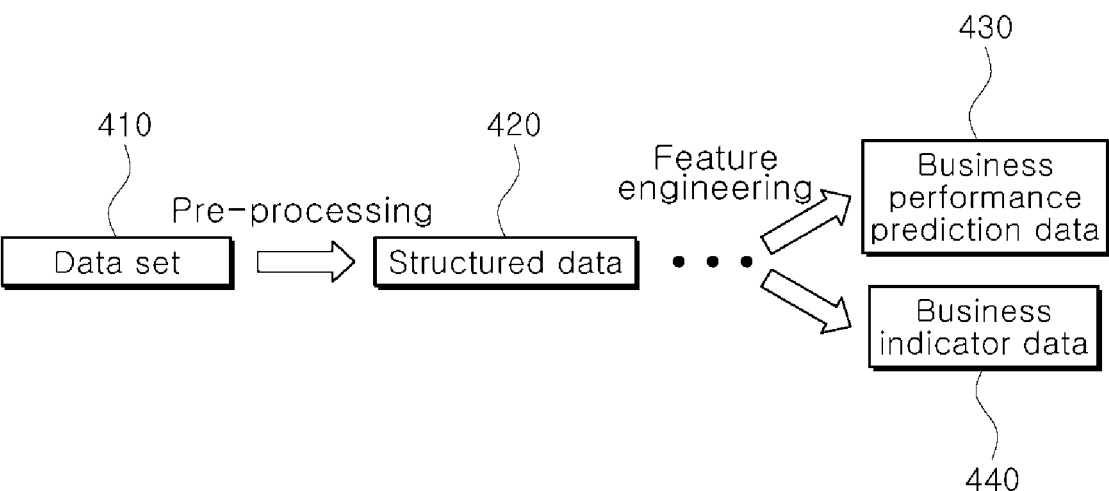
FIG. 4 is a schematic diagram of a data processing method, according to various embodiments of the inventive concept.

FIG. 4 is a schematic diagram of a data processing method, according to various embodiments of the inventive concept.

Referring to FIG. 4, a processor (e.g., the processor 210 in FIG. 2) may pre-process a data set 410. In detail, a process in which the processor processes the data set 410 into structured data 420 by pre-processing the data set 410 may correspond to S330 of FIG. 3.

According to an embodiment, the processor may perform feature engineering based on the structured data 420. The feature engineering refers to a process of generating or deriving a feature for helping developing a natural language processing application or solving problems related to natural language processing from raw data (e.g., a data set).

In detail, the feature engineering includes a process of extracting a feature from the structured data 420. The feature engineering aims to extract attributes or features that match result values to be derived through machine learning. In more detail, a feature may be defined as useful information or a predictable property when a predicted value (e.g., a result value) is output through natural language processing.

According to an embodiment, a company business performance predicting method according to an embodiment of the inventive concept may be a method of outputting a result value by using a data set as an input. The result value is a predicted value obtained by using a feature for an input, and the result value according to an embodiment of the inventive concept includes business performance prediction data 430 and business indicator data 440.

FIG. 4 is a diagram of a method for deriving a result value through natural language processing and feature engineering for a general input value, and may correspond to providing schematic data of a company business performance predicting method according to an embodiment of the inventive concept Moreover, in the process shown in FIG. 4, a specific machine learning model for performing a company business performance predicting method according to an embodiment of the inventive concept may be applied, and is not limited to a general model.

Figure 5:
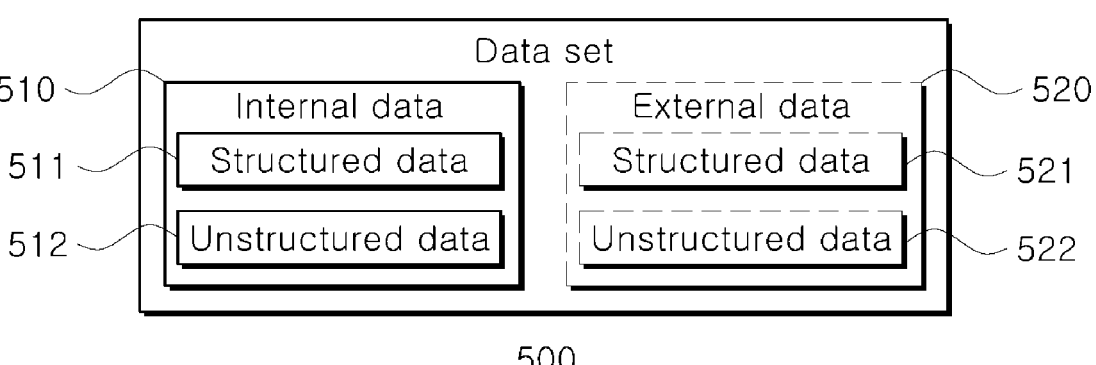
FIG. 5 is a block diagram of a data set used for a company business performance predicting method, according to various embodiments of the inventive concept.

FIG. 5 is a block diagram of a data set used for a company business performance predicting method, according to various embodiments of the inventive concept.

Referring to FIG. 5, a processor (e.g., the processor 210 of FIG. 2) may utilize a data set 500 as an input value for providing a result value of a company business performance predicting method according to an embodiment of the inventive concept.

The data set 500 is composed of internal data 510 and external data 520. The internal data 510 consists of structured data 511 and unstructured data 512. The external data 520 consists of structured data 521 and unstructured data 522. In FIG. 5, the fact that the external data 520 is indicated by a dotted line indicates that the processor may obtain the external data 520 from an external device (e.g., the external device 300 in FIG. 1).

The internal data 510 according to an embodiment includes financial statement data, management measurement indicator data, meeting minutes data, business report data, and survey data, which are related to the business performance of a specific company. For another example, the internal data 510 includes the structured data 511 and the unstructured data 512, such as employee attendance pattern data, e-mail data between employees, internal ERP system data, data of a project management system, regular or irregular performance measurement data, internal interview data, and internal diagnosis data of a specific company.

The external data 520 according to an embodiment includes online article data, text content data (e.g., related legal data, patent data, thesis data, domestic/overseas journal data, medical data, or book data for a specific company), video content data (e.g., online university lecture data or YouTube data for a specific company), external online community post data, and online portal data of the specific company. For another example, the external data 520 includes the structured data 521 and the unstructured data 522, which are related to management, such as data regarding an online shareholder bulletin board of a specific company.

Figure 6:
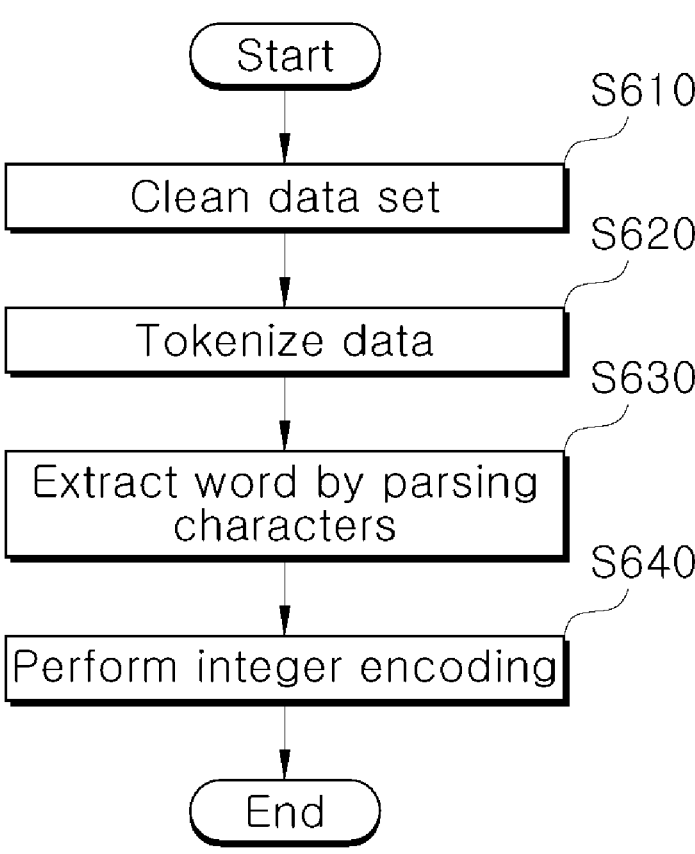
FIG. 6 is a schematic flowchart of performing data pre-processing, according to various embodiments of the inventive concept.

FIG. 6 is a schematic flowchart of performing data pre-processing, according to various embodiments of the inventive concept.

Referring to FIG. 6, a processor (e.g., the processor 210 in FIG. 2) may process unstructured data included in a data set into structured data. The process of processing such the data set includes a data pre-processing process.

According to an embodiment, a company business performance predicting method according to an embodiment of the inventive concept utilizes a text analysis process in the unstructured data. The text analysis process may be a process of extracting meaningful information from the unstructured data. That is, the processor processes the unstructured data into structured data and performs a process of extracting meaningful information, in which a specific company is interested, from original unstructured data.

The processor according to an embodiment may perform text pre-processing from the data set depending on the interest of a specific company. In S610, the processor may clean the data set. The cleaning of data refers to a process of removing noise from the data set.

To exclude parts that interfere with a tokenization process of S620 and to perform the tokenization process, the cleaning of data is performed prior to the tokenization process or is continuously performed to remove residual noise after the tokenization process.

The processor according to an embodiment may clean data by removing an infrequent character, a meaningless character, a symbol, or a stopword in a string of second data. Here, the meaningless character may be different from the stopword. The stopword may be defined within a predetermined package or directly defined by a developer.

In S620, a processor may perform a tokenization process on cleaned data. The data tokenization refers to a process of dividing a given data set in units of token. Here, the unit of the token may vary depending on situations. However, in general, the unit of the token may be set as a unit having a meaning. In this specification, a word is described as a unit of tokenization.

According to an embodiment, word tokenization may be a process of tokenizing characters in a string into words, which are the smallest units that have meaning. In contrast, the smallest unit having meaning in a character may be a morpheme. However, the smallest unit may be set to use a word as a unit by replacing the morpheme.

The processor according to an embodiment may perform a tokenization process by deleting a punctuation mark in the string and cutting the string based on whitespace.

In S630, the processor may extract a word by parsing characters. The parsing may be a process using a sentence or a token stream. The process may perform a parsing process to determine the structure by using the component structure of each word in a sentence.

According to an embodiment, the processor may extract a stem in a process of extracting words by parsing characters. The extracting of the stem may be performed by simplifying morphological analysis, and may be regarded as a process of cutting off the ending of a word by using only the set rule. A process of extracting a stem may be utilized to remove a stopword.

In S640, the processor may perform an integer encoding process. The integer encoding may be a process of assigning a unique integer to each word extracted through parsing. For example, the processor may assign the integer of "13" to word "book" and the integer of "16" to word "drawer".

According to an embodiment, the processor may assign an integer based on the occurrence frequency of a word when performing the integer encoding process. The processor may perform a pre-processing process for vocabulary analysis through zero-padding and one-hot encoding after the integer encoding. Here, the vocabulary means a set of different words.

The one-hot encoding corresponds to a method of expressing a word. The one-hot encoding uses the size of the vocabulary as the dimension of a vector. At this time, a value of 1 is assigned to the index of a word to be expressed, and a value of 0 is assigned to another index. The vector thus expressed is referred to as a "one-hot vector". The processor may identify the integer and vector for a word to be extracted from a string through the one-hot encoding.

Figure 7:
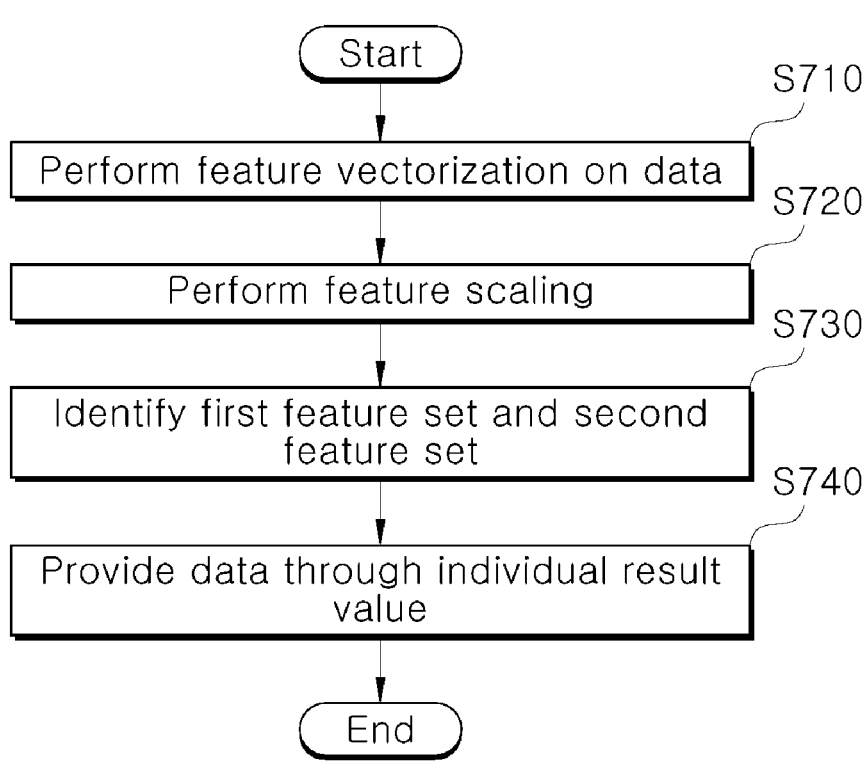
FIG. 7 is a schematic flowchart for providing company business performance prediction data and company business indicator data, according to various embodiments of the inventive concept.

FIG. 7 is a schematic flowchart for providing company business performance prediction data and company business indicator data, according to various embodiments of the inventive concept.

Referring to FIG. 7, a processor (e.g., the processor 210 in FIG. 2) may identify a feature from a word extracted from a data set. The processor may perform a process of feature vectorization on data by reflecting the occurrence frequency of a word extracted based on the data set and a weight according to the frequency.

The processor according to an embodiment may provide a result value by performing a feature engineering process of FIG. 7. The feature engineering may be a series of processes for improving the performance of a machine learning algorithm by converting raw data into a feature through a data mining technique.

In S710, the processor may perform a process of feature vectorization on data. The feature vectorization is a process of extracting a feature from the processed text and assigning a vector value to the extracted feature.

The processor according to an embodiment may extract a feature from data (e.g., a data set) related to business performance of a specific company and may allocate a vector value corresponding to a characteristic of the extracted feature. In this case, when the processor performs feature vectorization through a BOW model, a data set in a form of a sparse matrix may be generated In detail, the processor may generate a vector consisting of an occurrence frequency value by assigning a high weight to a word having a high occurrence frequent in the data set related to the business performance of a specific company. In this case, the weight may be set in proportion to the occurrence frequency and may be determined by a count value.

In S720, the processor may perform feature scaling. The feature scaling is a process used to regulate a range of independent variables or data features. The feature scaling may be referred to as data regularization, and may be performed continuously in a process of data pre-processing and feature scaling.

A processor according to an embodiment may perform a feature scaling process through re-scaling and standard regularization. In detail, the processor may perform re-scaling and standard regularization on first data and third data in the data set related to company business performance of a specific company.

The re-scaling may be referred to as min-max scaling. The processor may scale a feature of company business performance data having various categories to a range of [0, 1] or [−1, 1] through re-scaling. That is, the processor may reduce or enlarge data at the same ratio such that the data is located in the same numerical range through re-scaling. The standard regularization is a process of generating a distribution having a mean of 0 and a standard deviation of 1 by using individual features.

In S730, the processor may identify a feature set. The feature set includes a first feature set and a second feature set. The processor may generate business performance prediction data by using the first feature set. Furthermore, the processor may generate business indicator data by using the second feature set. In S740, the processor may provide data through an individual result value by utilizing an individual feature set.

According to an embodiment, a memory (e.g., the memory 230 in FIG. 2) may store information related to the first feature set, which is a feature set required to provide company business performance prediction data. Besides, the memory may store information related to the second feature set, which is a feature set necessary to provide business indicator data. Accordingly, the processor may provide a result value corresponding to each feature set by using each feature set stored in the memory.

According to an embodiment, the processor may utilize an ensemble model that provides company business performance prediction data based on result values to be analyzed by using a regression analysis and time-series analysis algorithm such as decision trees, regression analysis, and ARIMA.

According to an embodiment, the processor may provide company business performance prediction data through the ensemble model. In this case, the processor utilizes the first feature set. An equation for providing a predicted value through the ensemble model is generalized based on Equation (1) below.

$$\hat{y}_i = \sum_{k=1}^{k} f_k(x_i), \; f_k \in F \qquad \text{[Equation 1]}$$

However, $\hat{y}_i$ denotes a predicted value. $X_i$ denotes an input value. $f_k$ denotes a CART model.

The processor according to an embodiment may output the predicted value in Equation 1 as company business performance prediction data and may take an input value as a feature extracted from an individual data set.

According to an embodiment, the processor may utilize objective function obj for model training, loss function 'l', and regularization function 'w' for preventing overfitting. The relational expression between the objective function, the loss function, and the overfitting is as shown based on Equation 2 below.

$$obj = \sum_{i=1}^{n} l\left(y_i, \hat{y}_i^{(t)}\right) + \sum_{i=1}^{t} \omega(f_i) \qquad \text{[Equation 2]}$$

In Equation 2, the predicted value $\hat{y}_i^{(t)}$ at the t-th step may be expressed as Equation 3 below.

$$
\begin{aligned}
\hat{y}_i^{(0)} &= 0 \\
\hat{y}_i^{(1)} &= f_1(x_i) = \hat{y}_i^{(0)} + f_1(x_i) \\
\hat{y}_i^{(2)} &= f_1(x_i) + f_2(x_i) = \hat{y}_i^{(1)} + f_2(x_i) \\
&\vdots \qquad\qquad \vdots \\
\hat{y}_i^{(t)} &= \sum_{k=1}^{t} f_k(x_i) = \hat{y}_i^{(t-1)} + f_t(x_i)
\end{aligned}
\qquad \text{[Equation 3]}
$$

Accordingly, objective function $obj^{(t)}$ in a form of mean squared error (MSE) at the t-th step may be expressed as Equation 4 below.

$$
\begin{aligned}
obj^{(t)} &= \sum_{t=1}^{n} l\left(y_i, \hat{y}_i^{(t)}\right) + \sum_{i=1}^{t} \omega(f_i) \\
&= \sum_{i=1}^{n} l(y_i, \hat{y}_i^{(t-1)} + (f_t(x_i)) + \omega(f_t) + \text{constant}
\end{aligned}
\qquad \text{[Equation 4]}
$$

The processor according to the embodiment may process Equation 4 through Taylor expansion, and the result is indicated in Equation 5.

$$
\begin{aligned}
obj^{(t)} = & \\
\sum_{t=1}^{n} [l\left(y_i, \hat{y}_i^{(t-1)}\right) &+ (g_i, f_t(x_i)) + \frac{1}{2}\left(h_i f_t^2(x_i)\right) + \omega(f_t) + \text{constant}
\end{aligned}
\qquad \text{[Equation 5]}
$$

In this case, the processor may use Equation 6 below for $g_i$ and $h_i$ in Equation 5.

$$
\begin{aligned}
g_i &= \partial_{\hat{y}_i^{(t-1)}} l(y_i, \widehat{Y}_i^{(t-1)}) \\
h_i &= \partial^2_{\hat{y}_i^{(t-1)}} l(y_i, \widehat{Y}_i^{(t-1)})
\end{aligned}
\qquad \text{[Equation 6]}
$$

In Equation 6, $g_i$ and $h_i$ become the first and second partial derivative values of the loss function 'l' by Taylor expansion, respectively. At this time, because $l(y_i, \widehat{Y}_i^{(t-)})$ and a constant are values already known as values calculated in the previous step, the objective function at the t-th step is as shown in Equation 7.

$$= \sum_{i=1}^{n} [g_i, f_t(x_i)) + \frac{1}{2}\left(h_i f_t^2(x_i)\right] + \omega(f_t) \qquad \text{[Equation 7]}$$

$y_i$ provided by the processor according to the embodiment based on Equations 1 to 7 is company business performance prediction data. In other words, the company business performance prediction data includes stock price index data of a company and the company's own business indicator prediction data.

According to another embodiment, the processor may provide company business indicator data by utilizing the second feature set. In this case, the processor may map a result value for the second feature set based on a finance field, a customer field, a process field, and a sustainability field, which are predetermined statistical attribute fields.

In detail, the processor may map pieces of data, which are obtained by performing the feature engineering process, into the predetermined statistical attribute fields and may calculate a statistical value for each individual statistical attribute field. In this way, the processor may provide indicator data related to business performance statistics of a specific company.

According to an embodiment, the processor may provide company business indicator data of a specific company. The company business indicator data is statistical data, and the result values are provided depending on the predetermined statistical attribute fields. The predetermined statistical attribute fields may correspond to the results of regular or irregular responses obtained through Likert scale from internal or external stakeholders of a specific company.

The company business indicator data includes graph data corresponding to a predetermined statistical attribute field, correlation data, and comparison data with a target value. Each index may be a basic statistic of the four statistical attribute fields, and may be provided as numbers and graphs such as the number of samples, an average, a variance, a standard deviation, a minimum value, a maximum value, a median value, a most frequent value, and a quantile. For example, correlation data between individual indicators may be provided to easily understand the company business indicator data. For another example, the company business indicator data includes data regarding the comparison result by calculating a target level setting standard for each indicator and a current level.

FIG. 8 is a diagram of a data set, according to various embodiments of the inventive concept.

FIG. 8 is a diagram of the business management strategy target and measurement index of a specific company. Referring to FIG. 8, a processor (e.g., the processor 210 in FIG. 2) may identify structured data (e.g., the structured data 511 in FIG. 5) of FIG. 8. In particular, in FIG. 8, business indicator data provided through the processor may be identified.

The processor according to an embodiment may map and provide a result value for a finance strategy field (e.g., a finance field) among predetermined statistical attribute fields with respect to a strategy area. Here, the result value for the financial field provided by the processor includes a predicted value corresponding to the result value based on a first feature set and a statistical value corresponding to the result value mapped based on a second feature set.

According to an embodiment, the processor may provide result values mapped to individual categories of a strategy target, a measurement index, a measurement result, a target level, and a current level. Here, the categorization of the strategy target, the measurement index, the measurement result, the target level, and the current level may be set in advance and stored in a memory (e.g., the memory 230 in FIG. 2).

Referring to FIG. 8, the processor may identify subcategories of sales growth strategy (F1) and productivity improvement (F2) in a strategy target category. In this case, the processor may derive result values mapped to subcategories F1.1, F1.2, F2.1, F2.2, and F2.3 of the measurement index corresponding to subcategories from a data set, respectively.

The processor according to an embodiment may provide a result value corresponding to the measurement result, a result value corresponding to the target level, and a result value corresponding to the current level. Here, the result value corresponding to the measurement result may be a result value derived by the processor based on the second feature set, and a result value corresponding to the current level may also be a result value derived based on the second feature set. The result value corresponding to the target level may be data loaded by the processor from the memory.

Although not shown in FIG. 8, the processor may provide company business performance prediction data in a manner similar to FIG. 8. For example, the processor may perform a feature engineering process on a data set and then may apply an ensemble model based on the first feature set among the extracted features to provide stock price index data of the corresponding company and a predicted value for the company business indicator index.

The company business performance prediction data provided through the processor is a result value continuously calculated through machine learning. Accordingly, the processor may provide a user (e.g., a user of the user terminal 400 in FIG. 1) with accurate prediction results by applying a pre-processing process, a feature engineering process, and an ensemble model according to an embodiment of the inventive concept to the same input value (e.g., a data set).

Meanwhile, the disclosed embodiments may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium.

The computer-readable recording medium may include all kinds of recording media in which instructions capable of being decoded by a computer are stored. For example, there may be read only memory (ROM), random access memory (RAM), magnetic tape, magnetic disk, flash memory, optical data storage device, and the like.

Disclosed embodiments are described above with reference to the accompanying drawings. One ordinary skilled in the art to which the inventive concept belongs will understand that the inventive concept may be practiced in forms other than the disclosed embodiments without altering the technical ideas or essential features of the inventive concept. The disclosed embodiments are examples and should not be construed as limited thereto.

According to the above-mentioned problem solving means of the inventive concept, clear predicted values and statistical values for company business performance may be identified by providing company business performance prediction data for a specific company by using internal data and external data related to the management of a specific company, and providing, as the statistical values, company business indicator data based on data up to now.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A business performance predicting method performed by a company business performance predicting apparatus, the method comprising:

obtaining, by an information collection unit, a data set including internal data and external data of a specific company;

classifying, by an information classification unit, the data set into first data including structured data and second data including unstructured data;

processing, by an information processing unit, the second data into third data being structured data corresponding to the first data;

extracting, by a feature extraction unit, a feature based on the first data and the third data by performing converting raw data into the feature through a data mining technique; and providing, to an external device, business performance prediction data of the specific company and business indicator data of the specific company mapped to a predetermined statistical attribute field through a predetermined prediction model in response to an individual characteristic of the feature, wherein the extracting of the feature includes:

performing feature vectorization on the first data and the third data in consideration of a word extraction frequency in the first data and the third data and a weight according to the frequency; and after the feature vectorization, performing feature scaling through re-scaling and standard regularization on the first data and the third data, wherein the performing of the feature vectorization comprises extracting the feature from a processed text, and assigning a vector value to the extracted feature, wherein the extracting of the features comprises:

when the feature vectorization is processed through a bag-of-word (BOW) model, a data set in a form of a sparse matrix is generated, and a vector consisting of an occurrence frequency value is generated by assigning a high weight to a word having a high occurrence frequent in the data set, wherein the weight is set in proportion to the occurrence frequency and is determined by a count value, and wherein the providing of the business performance prediction data comprises:

providing the business performance prediction data through an ensemble model, by using Equation (1) below:

$$\hat{y}_1 = \sum_{k=1}^{k} f_k(x_i), \; f_k \in F \qquad \text{[Equation 1]}$$

where $\hat{y}_l$ denotes a predicted value, which is the business performance prediction data, $X_i$ denotes an input value, which is the extracted feature, and $f_k$ denotes a classification and regression trees (CART) model.

2. The method of claim 1, wherein the obtaining of the data set includes:

obtaining the internal data including financial statement data, management measurement indicator data, meeting minutes data, business report data, and survey data, which are related to business performance of the specific company; and obtaining the external data including online article data, video content data, text content data, external online community post data, and online portal data of the specific company.

3. The method of claim 1, wherein the processing of the second data into the third data includes:

identifying a string of the second data; and performing pre-processing of information extraction, character tokenization, and word extraction based on the string of the second data.

4. The method of claim 3, wherein the performing of the pre-processing includes:

cleaning data by removing an infrequent character, a meaningless character, a symbol, or a stopword in the string of the second data;

tokenizing characters in the string of the second data into the smallest units having meaning;

extracting a word by parsing the tokenized characters; and performing integer encoding in consideration of a frequency at which the word is extracted from the string of the second data.

5. The method of claim 1, further comprising:

identifying a first feature set used to construct the business performance prediction data; and identifying a second feature set used to construct the business indicator data.

6. The method of claim 1, wherein the providing of the business performance prediction data includes:

identifying a result value for a first feature set through the predetermined model composed of the CART model in an extreme gradient boosting (XGB) method; and providing the business performance prediction data including stock index prediction data and business indicator prediction data of the specific company based on the result value.

7. The method of claim 1, wherein the providing of the business indicator data of the specific company includes:

mapping a result value for a second feature set based on the predetermined statistical attribute field including a financial field, a customer field, a process field, and a sustainability field; and providing the business indicator data including graph data corresponding to the predetermined statistical attribute field, correlation data, and comparison data with a target value based on the result value.

8. A company business performance predicting apparatus comprising:

a communication unit;

a memory; and a processor, wherein the processor is configured to:

obtain a data set including internal data and external data of a specific company from the memory through an information collection unit;

classify the data set into first data including structured data and second data including unstructured data through an information classification unit;

process the second data into third data being structured data corresponding to the first data through an information processing unit;

extract a feature based on the first data and the third data through a feature extraction unit by performing converting raw data into the feature through a data mining technique; and provide, to an external device, business performance prediction data of the specific company and business indicator data of the specific company mapped to a predetermined statistical attribute field through a predetermined prediction model in response to an individual characteristic of the feature, wherein the processor is further configured to, in extracting of the feature:

perform feature vectorization on the first data and the third data in consideration of a word extraction frequency in the first data and the third data and a weight according to the frequency; and after the feature vectorization, perform feature scaling through re-scaling and standard regularization on the first data and the third data, wherein the processor is further configured to, in performing of the feature vectorization, extract the feature from a processed text, and assign a vector value to the extracted feature, wherein, in extracting of the features, when the feature vectorization is processed through a bag-of-word (BOW) model, a data set in a form of a sparse matrix is generated, and a vector consisting of an occurrence frequency value is generated by assigning a high weight to a word having a high occurrence frequent in the data set, wherein the weight is set in proportion to the occurrence frequency and is determined by a count value, and wherein the processor is further configured to, in providing of the business performance prediction data:

provide the business performance prediction data through an ensemble model, by using Equation (1) below:

$$\hat{y}_1 = \sum_{k=1}^{k} f_k(x_i), \; f_k \in F \qquad \text{[Equation 1]}$$

where $\hat{y}_l$ denotes a predicted value, which is the business performance prediction data, $X_i$ denotes an input value, which is the extracted feature, and $f_k$ denotes a classification and regression trees (CART) model.

9. A non-transitory computer-readable recording medium storing a program for performing following operations for performing a method performed by a company business performance predicting apparatus, when executed by at least one processor, wherein the operations includes:

obtaining, by an information collection unit, a data set including internal data and external data of a specific company;

20 classifying, by an information classification unit, the data set into first data including structured data and second data including unstructured data;

processing, by an information processing unit, the second data into third data being structured data corresponding to the first data;

extracting, by a feature extraction unit, a feature based on the first data and the third data by performing converting raw data into the feature through a data mining technique; and providing, to an external device, business indicator data of the specific company by mapping to business performance prediction data of the specific company and a predetermined statistical attribute field through a predetermined prediction model in response to an individual characteristic of the feature, wherein the extracting of the feature includes:

performing feature vectorization on the first data and the third data in consideration of a word extraction frequency in the first data and the third data and a weight according to the frequency; and after the feature vectorization, performing feature scaling through re-scaling and standard regularization on the first data and the third data, wherein the performing of the feature vectorization comprises extracting the feature from a processed text, and assigning a vector value to the extracted feature, wherein the extracting of the features comprises:

when the feature vectorization is processed through a bag-of-word (BOW) model, a data set in a form of a sparse matrix is generated, and a vector consisting of an occurrence frequency value is generated by assigning a high weight to a word having a high occurrence frequent in the data set, wherein the weight is set in proportion to the occurrence frequency and is determined by a count value, and wherein the providing of the business performance prediction data comprises:

providing the business performance prediction data through an ensemble model, by using Equation (1) below:

$$\hat{y}_1 = \sum_{k=1}^{k} f_k(x_i), \; f_k \in F \qquad \text{[Equation 1]}$$

where $\hat{y}_l$ denotes a predicted value, which is the business performance prediction data, $X_i$ denotes an input value, which is the extracted feature, and $f_k$ denotes a classification and regression trees (CART) model.

* * * * *